Patented July 25, 1933

1,919,850

UNITED STATES PATENT OFFICE

EMIL LÜSCHER, OF BASEL, SWITZERLAND, ASSIGNOR TO FIRM LONZA ELEKTRIZITATS-WERKE UND CHEMISCHE FABRIKEN AKTIENGESELLSCHAFT, OF BASEL AND GAMPEL, SWITZERLAND

CONCENTRATION OF AQUEOUS FORMIC ACID

No Drawing. Application filed July 15, 1931, Serial No. 551,065, and in Germany July 18, 1930.

It is already known to concentrate aqueous acetic acid by extracting same with organic bases practically insoluble in water and subsequently distilling off the acetic acid from the extract. It is further known to reduce the solubility of the organic bases in the aqueous phase by adding thereto highly boiling hydrocarbons. A similar effect can also be obtained if a certain quantity of soluble salts is introduced into the aqueous acid to be extracted.

All these methods are not suitable for the concentration of aqueous formic acid, as the resulting formates are so strongly retained by the water that the extraction with organic bases will be extremely troublesome. If for example 100 gr. of formic acid of 20% strength are mixed with 100 gr. of quinoline and 100 gr. of trichlorethylene, this mixture on ordinary shaking may give by extraction about 25% only of the formic acid contained in the water, whilst under the same conditions with acetic acid about 75% thereof goes into the extracting agent.

It has now been found that formic acid can directly be concentrated in a very easy manner by means of one or more high boiling organic bases if formic acid is subjected in presence of the base or bases without previous extraction to a fractional distillation.

By high boiling organic bases there are to be understood in the sense of the present invention all that comply with the following conditions: they must have a higher boiling point than formic acid; when being heated with formic acid, they shall not undergo any prejudicial alteration; they must give with aqueous formic acid neutral or still better acid formates which on distillation of the water under elevated, ordinary or reduced pressure do not decompose themselves to an appreciable extent; finally they must give with the formic acid salt like compounds which at higher temperatures or at a lower pressure or vacuum split themselves into their components, that is into the acid and base or into the acid and neutral formates. Such bases are for example quinoline, quinaldine, picoline, dimethylaniline, diethylaniline and so on or mixtures thereof.

It may be advantageous to conduct the distillation in such a way that the water is first completely or nearly so eliminated under ordinary pressure conditions and subsequently the formic acid is fractionally separated from the base or bases by distillation in vacuo. Thus, there is obtained beside a small initial yield of more or less dilute formic acid, an almost quantitative output of highly concentrated formic acid of about 90-99% strength.

The output in highly concentrated formic acid can still be improved if from the moment where appreciable quantities of acid begin to pass with the water vapors, there are introduced into the column of distillation suitable quantities of high boiling organic bases or mixtures thereof or also corresponding quantities of neutral formate that are capable of binding the free acid, whereby this introduction may advantageously be carried out according to the counter-current principle.

In using a good column and with convenient vapor tension relations of the water, acid and base, the proportion of the base to the acid can easily be regulated in such a manner that there will be practically neither losses in acid, nor in base. The base residue can again be used for a further operation. In the described process, the consumption of steam for the separating operation as well as the required quantity of base are much smaller than in the known similar methods.

It is advisable to work with the bases without the same being present in excess.

The following examples illustrate the improved process.

Example 1

A formic acid of 20% strength was mixed with so much quinoline that about one molecule of quinoline comes on 3 molecules of the formic acid. Then the mixture was subjected to a fractional distillation under ordinary pressure; thus, the main quantity of the water together with but a very little quantity of formic acid was first eliminated. The subsequent distillation in vacuo gave a highly concentrated acid of about 90–99% strength.

A second test, in which one molecule of quinoline was used for about 2 molecules of formic acid, gave under the same working conditions almost exclusively highly concentrated acid.

Example 2

385 gr. of formic acid of 25% strength were mixed with 100 gr. of quinaldine. From this mixture the greatest part of water was distilled off under ordinary or normal pressure by means of a reflux column, whereupon the concentrated formic acid was distilled off at a pressure of 26 mm. From the used formic acid about 6% were recovered as formic acid of 2% strength, whilst the remainder was recovered as formic acid of 91.5% strength.

Example 3

In the above examples, other organic bases such as dimethylaniline or diethylaniline can be used. Also solid bases can be employed, such as for example orthophenyldiamine, after transformation thereof into the anhydrous base by boiling with concentrated nitric acid (benzimidozol, see Beilstein, III edition, Vol. IV, pg. 868). Thus, about 55 gr. of this anhydrous base were mixed with about 260 gr. of formic acid of 25% strength and from this mixture the concentrated formic acid was obtained at a reduced pressure of about 26–28 mm. About 4.5% of the used formic acid (calculated for 100%) were distilled off as acid of about 2% strength, 5% as acid of about 35% strength and 73% as acid of 82–95% strength. A small portion remained in the residue.

With respect to the numeric indications of the quantity and composition of the different fractions it may be noted that these values are greatly dependent on the kind of construction and on the capacity of the used column of distillation. When using good columns the working can be conducted so as to obtain the whole acid in highly concentrated form of 85–99% strength.

There exists a process for the concentration of formic acid wherein a carrying liquid is added to the formic acid which forms with the water contained in the formic acid a binary mixture with minimum boiling point, a so-called azeotropic mixture. On subsequent distillation, first the water together with the added carrying liquid and then the formic acid pass over.

Contrarily to this, in the present invention, the addition of a high boiling base to the aqueous formic acid in a proportion of for example 1 molecule of quinoline for 3 molecules of formic acid causes the production of a salt like compound of the base with the acid, whereby on the subsequent fractional distillation from the salt mixture first the water with some formic acid passes over under ordinary pressure and thereupon only by distillation in vacuo under splitting of the salt like compound a formic acid of 90–99% strength, the added high boiling organic base remaining in the distilling vessel.

Thus, while in the known process the carrying liquid passes over with the water, the high boiling organic base remains in the present process in the distilling vessel and can be immediately used again, which constitutes a great advantage over said known process.

Further, the already proposed treatment of aqueous formic acid with entirely dehydrated forms of crystal water binding salts, such as magnesium sulphate and copper sulphate can not be compared to the use of high boiling organic bases as suggested by the present invention.

What I claim is:

1. A process for the concentration of aqueous formic acid, comprising subjecting the aqueous formic acid to direct fractional distillation in presence of such high boiling organic bases that have a higher boiling point than formic acid, are free from any substantial alteration when being treated with formic acid and are capable of forming with formic acid salt like compounds which are unable to decompose on elimination of water, but at higher temperatures are split into their components.

2. A process for the concentration of aqueous formic acid, comprising subjecting the aqueous formic acid to direct fractional distillation in presence of such high boiling organic bases that have a higher boiling point than formic acid, are free from any substantial alteration when being treated with formic acid and are capable of forming with formic acid salt like compounds which are unable to decompose on elimination of water, but at higher temperatures are split into their components, said fractional distillation being so conducted that at first the water is eliminated substantially completely under ordinary pressure and that thereafter the formic acid is separated from the base by fractional distillation in vacuo.

3. A process for the concentration of aqueous formic acid, comprising subjecting the aqueous formic acid to direct fractional distillation in presence of such high boiling organic bases that have a higher boiling point than formic acid, are free from any substantial alteration when being treated with formic acid and are capable of forming with formic acid salt like compounds which are unable to decompose on elimination of water, but at higher temperatures are split into their components, said fractional distillation being so conducted that at first the water is eliminated substantially completely under ordinary pressure and that thereafter the formic acid is separated from the base by distillation in vacuo, while introducing during the elimination of water, when appreciable quantities of acid begin to pass over with the water vapors, a suitable quantity of high boiling organic base thereinto to bind the escaping free acid.

4. A process for the concentration of aqueous formic acid, comprising subjecting the aqueous formic acid to direct fractional distillation in presence of such high boiling organic bases that have a higher boiling point than formic acid, are free from any substantial alteration when being treated with formic acid and are capable of forming with formic acid salt like compounds which are unable to decompose on elimination of water, but at higher temperatures are split into their components, said fractional distillation being conducted without having the high boiling organic base in excess.

5. A process for the concentration of aqueous formic acid, comprising subjecting the aqueous formic acid to a direct fractional distillation in presence of quinoline in a proportion of about 1 molecule thereof for about 3 molecules of formic acid.

EMIL LÜSCHER.